Patented Sept. 14, 1937

2,093,213

UNITED STATES PATENT OFFICE 2,093,213

PLASTIC COMPOSITION AND THE METHOD OF COMPOUNDING THE SAME

Arthur F. Rowe, Lansing, Mich.

No Drawing. Application May 6, 1936,
Serial No. 78,072

2 Claims. (Cl. 134—79)

This invention relates to plastic compositions and the method of compounding the same. The present application is a continuation-in-part of my earlier application Serial No. 705,397 filed January 5, 1934, which latter application is a continuation-in-part of an earlier application Serial No. 472,492 filed August 1, 1930.

The principal object of this invention is to provide a plastic composition which dries upon exposure to the air without shrinking and which when dried is hard and tough but not brittle. This object is attained in part by combining various ingredients in the proportions specified hereinafter and more particularly by the method of compounding the same.

Prior to the present invention there were various plastic compositions for use in filling wood crevices and similar purposes. All of these plastic compositions of the prior art have a tendency either to shrink and become brittle upon exposure to the air or are soluble in various fluids such as water, gasoline and lacquer. The present invention provides a plastic composition which hardens upon drying but does not shrink and which is insoluble in the various fluids mentioned above as well as most others. Accordingly, the plastic composition compounded as hereinafter described is especially suitable for use in filling screw holes, or the like, in the bottom of boats or other articles normally immersed in water or other fluids. The present plastic composition is also especially adapted for use in filling crevices in furniture and similar articles where lacquer or similar finishing materials are used as a coating over the plastic composition.

In the preferred form of the invention a small quantity of bleached litharge is added to a quantity of nitro-cellulose solvent. After being introduced into the nitro-cellulose solvent the litharge is worked in any suitable manner to break the same up into finely divided particles and to thoroughly mix the same with the solvent. Preferably as much litharge is added to the nitro-cellulose solution as the solution will hold in suspension. It should be here understood that, while it is believed that the litharge is merely suspended in the form of fine particles in the nitro-cellulose solution, it may be that the same is dissolved or that a chemical reaction occurs between the nitro-cellulose solution and the litharge. Regardless of the nature of the action which occurs it is essential that the litharge be thoroughly mixed with the nitro-cellulose solution until the resulting product is homogeneous throughout.

The nitro-cellulose solvent may consist of any of the conventional solvents of this character. A satisfactory solvent comprises thirty parts of butyl acetate, sixty parts of toluol and ten parts of butyl alcohol. This solution is what may be termed a slow solvent. A solution consisting of fifty parts of toluol, twenty-five parts of thymal alcohol, twelve and a half parts ethyl acetate and twelve and a half parts benzol constitutes what may be called a fast solvent. The nature of the use to which the plastic composition is to be subjected will determine the character of the solvent which is to be used.

After the litharge has been added to the nitro-cellulose solvent as described above, the product thus formed is added to a nitro-cellulose solution. The quantity of the nitro-cellulose solution is such that the mixture of litharge and nitro-cellulose solvent can be thoroughly and homogeneously admixed therewith before the resulting mass thickens to such an extent as to prevent further admixture. The solvent containing the litharge and the nitro-cellulose solution is stirred or mixed continuously until the solution begins to thicken. The solution thus obtained may be conveniently referred to as a base for plastic compositions. As hereinafter described the proportions of solvent and nitro-cellulose in the base may be varied to produce a surfacer or substantially transparent paint which is waterproof, and which is insoluble in water, alcohol, gasoline, and the like.

While it is preferred to form a premixture of litharge and nitro-cellulose solvent as described herein and thereafter add a nitro-cellulose solution thereto, if desired, the litharge may be added to a relatively large quantity of nitro-cellulose solvent in which case any form of nitro-cellulose (not in solution) and a suitable ester gum may then be added to the mixture of nitro-cellulose solvent and the litharge. Likewise, the litharge may be added directly to an adequate quantity of nitro-cellulose solution without the preliminary formation of the mixture of litharge and nitro-cellulose solvent providing the litharge is homogeneously mixed with the nitro-cellulose solution. It has been found, however, that the nitro-cellulose solution has a tendency to thicken so rapidly upon the introduction of litharge directly thereinto that it is substantially impossible to distribute the litharge homogeneously throughout the same without first forming a preliminary mixture of nitro-cellulose solvent and litharge. In any case, it is essential that the litharge be so thoroughly mixed with the nitro-cellulose solution that it is homogeneously distributed throughout that solution.

Where it is desired to give the plastic composition a distinctive color the necessary quantity of suitable pigments may be added either to the mixture of litharge and nitro-cellulose solvent or to the nitro-cellulose solution at the time the mixture of litharge and nitro-cellulose solvent is added thereto.

After the litharge has been mixed with the nitro-cellulose solution to form a homogeneous viscous mass, the same is introduced into a receptacle containing a homogeneous mixture of various filler materials. These fillers which have been previously thoroughly mixed preferably include finely divided wood flour, silica, and whiting. The proportion of these fillers will vary depending upon the characteristics desired in the resulting product. Any other suitable fillers in varying quantities may be used although it is preferred in any case that some form of fibrous material be included in the fillers as such material forms the best type of binder.

The nitro-cellulose solution containing the litharge and the fillers is thoroughly kneaded until the resulting product is of a uniform plastic consistency. The quantity and proportions of fillers used will depend upon the character of plastic composition desired. For a composition which will be suitable as a surface glaze a relatively small quantity of filler will be used. Where the resulting product is to be used as a filler for screw holes, or the like, a relatively greater quantity of filler will be used.

The nitro-cellulose solution used in preparing the present plastic composition preferably consists of two pounds of nitro-cellulose and one pound of ester gum dissolved in one gallon of nitro-cellulose solvent. The solvent preferably consists, as mentioned hereinbefore, of thirty parts of butyl acetate, sixty parts of toluol and ten parts of butyl alcohol.

The fillers are preferably mixed in the following approximate proportions:

| | Percent |
|---|---|
| Whiting | 65 to 75 |
| Silex | 10 to 15 |
| Wood flour | 10 to 25 |

The litharge is mixed with the nitro-cellulose solution in the approximate proportion of three ounces of litharge to three quarts of nitro-cellulose solution. The fillers are mixed with the nitro-cellulose solution containing the litharge in the approximate proportions of three quarts of solution to from ten to fifteen pounds of filler.

A complete formula for compounding approximately twenty pounds of plastic composition is as follows:

| | |
|---|---|
| Nitro-cellulose solution | 2 quarts |
| Litharge | 3 ounces |
| Whiting | 8 pounds |
| Silex | 1½ pounds |
| Wood flour | 1 to 3 pounds |

Instead of adding the fillers to the homogeneous mixture of litharge and nitro-cellulose solution as just described, the mixture may be diluted with additional nitro-cellulose solvent to produce a liquid paint or surfacer having all the desirable characteristics of the plastic composition. That is to say, the surfacer will dry quickly upon exposure to air and when dried is hard and tough but not brittle. It will not chip. Likewise, when dry the surfacer thus formed is insoluble in such fluids as water, gasoline, lacquer and the like.

Best results are obtained in producing the surfacer or paint from the plastic composition base by diluting the same so that it contains not less than twenty and not more than fifty percent of solids. The amount of litharge used will depend upon the percentage of solids. The proportion of litharge will vary from approximately one-sixteenth ounce to a gallon of nitro-cellulose solution containing twenty percent solids to one-quarter ounce of litharge to a gallon of solution containing fifty percent of solids. In any event, the litharge must be homogeneously mixed with a small quantity of solvent before being added to the nitro-cellulose solution.

The base for the plastic composition may be originally prepared of a consistency suitable for use as a paint or surfacer.

To produce the plastic composition, it is then only necessary to increase the percentage of solids in the base and add the fillers in the proportions previously recited.

A base suitable for use as a paint or surfacer is prepared as follows: approximately one-sixteenth ounce of bleached litharge is added to a small quantity of nitro-cellulose solvent and homogeneously mixed therewith. The amount of solvent that is used is immaterial, the only requisite being that sufficient solvent is used to permit a complete and homogeneous dissolution or suspension, as the case may be, of the litharge in the solvent. For the purpose of this preliminary mixture any of the constituent parts of the solvent may be used in lieu of the solvent if desired.

The homogeneous mixture of litharge and solvent prepared as just described is then added to and thoroughly mixed with approximately one gallon of nitro-cellulose solution containing approximately twenty percent of solids. The product thus formed is of suitable viscosity to permit application by means of brushes or sprays such as those conventionally used in the application of paints and lacquers.

While only certain typical proportions of the ingredients required have been set forth herein it should be understood that these may be varied within relatively wide limits so long as the litharge is ultimately thoroughly and homogeneously mixed with the nitro-cellulose solution. The scope of the invention is indicated in the appended claims.

I claim:

1. The method of compounding a base for plastic compositions suitable for use as a paint or surfacer which comprises forming a preliminary homogeneous mixture of litharge and nitro-cellulose solvent and thereafter introducing into and thoroughly mixing with such preliminary mixture a quantity of nitro-cellulose solution, the proportions of the litharge to the nitro-cellulose solution being between approximately one-sixteenth and one-quarter ounce of litharge to approximately one gallon of nitro-cellulose solution of a character containing between twenty and fifty percent of solids.

2. A base for a plastic composition suitable for use as a paint or surfacer comprising a homogeneous mixture of litharge and nitro-cellulose solution combined in the proportions of between one-sixteenth and one-quarter ounce of litharge to one gallon of nitro-cellulose solution of a consistency varying from twenty to fifty percent of solids.

ARTHUR F. ROWE.